United States Patent
Zhang et al.

(10) Patent No.: US 10,196,543 B2
(45) Date of Patent: Feb. 5, 2019

(54) FAST BONDING HAIR/EYELASH EXTENSION ADHESIVE COMPOSITIONS BASED ON MEDICAL GRADE HIGH VISCOSITY CYANOACRYLATES

(75) Inventors: Sheng Zhang, Hickory, NC (US); Rafael Ruiz, Sr., Hudson, NC (US)

(73) Assignee: Adhezion Biomedical, LLC, Wyomissing, PA (US)

( * ) Notice: Subject to any disclaimer, the term of this patent is extended or adjusted under 35 U.S.C. 154(b) by 1090 days.

(21) Appl. No.: 13/077,530

(22) Filed: Mar. 31, 2011

(65) Prior Publication Data

US 2012/0247497 A1 Oct. 4, 2012

(51) Int. Cl.
*A61K 8/81* (2006.01)
*C09J 4/00* (2006.01)
*A61Q 90/00* (2009.01)

(52) U.S. Cl.
CPC ...................................... *C09J 4/00* (2013.01)

(58) Field of Classification Search
None
See application file for complete search history.

(56) References Cited

U.S. PATENT DOCUMENTS

| | | | |
|---|---|---|---|
| 3,607,542 A | | 9/1971 | Leonard et al. |
| 3,654,239 A | * | 4/1972 | McIntire ...................... 526/193 |
| 4,477,607 A | | 10/1984 | Litke |
| 4,533,422 A | | 8/1985 | Litke |
| 4,636,539 A | | 1/1987 | Harris et al. |
| 4,686,247 A | | 8/1987 | Yosida |
| 4,720,513 A | | 1/1988 | Kameyama et al. |
| 4,749,778 A | | 6/1988 | Fukuzawa et al. |
| 4,764,545 A | | 8/1988 | Yosida |
| 4,837,260 A | * | 6/1989 | Sato et al. ..................... 524/261 |
| 4,934,387 A | | 6/1990 | Megna |
| 4,980,086 A | | 12/1990 | Hiraiwa et al. |
| 4,997,861 A | | 3/1991 | Hechenberger et al. |
| 5,072,745 A | | 12/1991 | Cheh |
| 5,107,867 A | | 4/1992 | Barrington |
| 5,121,761 A | | 6/1992 | Meister |
| 5,248,708 A | | 9/1993 | Uemura et al. |
| 5,328,944 A | | 7/1994 | Attarwala et al. |
| 5,340,873 A | | 8/1994 | Mitry |
| 5,373,035 A | | 12/1994 | Uemura et al. |
| 5,480,935 A | | 1/1996 | Greff et al. |
| 5,575,298 A | | 11/1996 | Hinton |
| 5,665,817 A | | 9/1997 | Greff et al. |
| 5,868,145 A | | 2/1999 | Spann |
| 5,894,846 A | | 4/1999 | Gang |
| 5,899,209 A | | 5/1999 | McDonald et al. |
| 6,010,714 A | * | 1/2000 | Leung et al. ................. 424/448 |
| 6,029,674 A | | 2/2000 | Han |
| 6,135,122 A | | 10/2000 | Campbell et al. |
| 6,191,202 B1 | | 2/2001 | Greff et al. |
| 6,323,275 B2 | | 11/2001 | Takahashi et al. |
| 6,405,736 B2 | | 6/2002 | Townsend |
| 6,797,107 B1 | | 9/2004 | Kotzey |
| 6,935,348 B2 | | 8/2005 | Gold |
| 6,938,624 B2 | | 9/2005 | Arroyo et al. |
| 7,070,902 B2 | | 7/2006 | Mulligan et al. |
| 7,201,171 B2 | | 4/2007 | Sthair |
| 7,246,623 B2 | | 7/2007 | Arroyo et al. |
| 7,320,327 B2 | | 1/2008 | Frazier |
| 7,390,851 B1 | | 6/2008 | Misiak |
| 7,533,676 B2 | | 5/2009 | Sthair |
| 7,569,634 B2 | | 8/2009 | Kaszubski et al. |
| 7,600,519 B2 | | 10/2009 | Dinh |
| 7,614,403 B2 | | 11/2009 | Nomura |
| 7,621,966 B2 | | 11/2009 | Brun |
| 7,682,405 B2 | | 3/2010 | Brun et al. |
| 7,687,053 B2 | | 3/2010 | Porter |
| 7,726,321 B2 | | 6/2010 | Arroyo et al. |
| 7,772,306 B2 | | 8/2010 | Blacklock et al. |
| 2005/0025707 A1 | * | 2/2005 | Patterson et al. ............... 424/9.4 |
| 2005/0042196 A1 | * | 2/2005 | Askill et al. ............... 424/78.27 |
| 2007/0006890 A1 | | 1/2007 | Sthair |
| 2007/0050207 A1 | | 3/2007 | Merszei |
| 2007/0227550 A1 | | 10/2007 | Merszei |
| 2007/0295353 A1 | | 12/2007 | Dinh |
| 2008/0011314 A1 | | 1/2008 | Arroyo et al. |
| 2008/0196732 A1 | | 8/2008 | Merszei |
| 2008/0295856 A1 | | 12/2008 | Kallabat et al. |
| 2009/0014023 A1 | | 1/2009 | Waters |
| 2009/0217938 A1 | | 9/2009 | Rabe et al. |
| 2009/0266376 A1 | | 10/2009 | Beschta |
| 2009/0317353 A1 | | 12/2009 | Zhang et al. |

(Continued)

OTHER PUBLICATIONS

Fumed Silica Controls Rheology of Adhesives and Sealants.http://www.adhesivesmag.com/articles/fumed-silica-controls-rheology-of-adhesives-and-sealants. Published Oct. 5, 2000.*
Kim, et al., "Production of BSA-poly(ethyl cyanoacrylate) nanoparticles as a coating material that improves wetting property", Colloids and Surfaces B: Biointerfaces, 107 (2013), pp. 68-75.
Bertholon-Rajot, et al., "Influence of the initiator system, cerium-polysaccharide, on the surface properties of poly (isobutylcyanoacrylate) nanoparticles", Polymer, 46 (2005), pp. 1407-1415.
Han, et al., "Synthesis and degradation behavior of poly(ethyl cyanoacrylate)", Polymer Degradation and Stability, 93 (2008), pp. 1243-1251.
Bevington, et al., "Polymerization of Methyl a-Cyanoacrylate-II Conditions for Radical Polymerization", European Polymer Journal, vol. 12 (1976), pp. 255-257.

(Continued)

*Primary Examiner* — David J Blanchard
*Assistant Examiner* — Lori K Mattison
(74) *Attorney, Agent, or Firm* — Stradley Ronon Stevens & Young, LLP

(57) ABSTRACT

A fast-bonding and long-lasting adhesive composition with a high viscosity for attaching eyelash/hair extension systems to human eyelash/hair, comprising: a cyanoacrylate monomer having a straight alkyl chain length of from 4 to 16 carbon atoms; an organic polymer thickening agent; an inorganic thickening agent; and a bonding accelerator, wherein the inorganic thickening agent does not separate from the composition.

19 Claims, No Drawings

(56) References Cited

U.S. PATENT DOCUMENTS

2009/0318583 A1   12/2009  Zhang et al.
2010/0006115 A1    1/2010  Croes-Stoffer
2010/0059079 A1    3/2010  Tokko
2010/0154815 A1    6/2010  Chang

OTHER PUBLICATIONS

Cabot Corporation, MA-USA, "Fumed Silica and Fumed Alumina in Coatings Applications", Fumed Metal Oxides Brochure, 2008, pp. 1-20.

Shirono, et al., "Characteristics of Alkyltrimethocysilane-Treated Fumed Silicas and Reological Behavior of Fumed Silica Suspensions in an Epoxy Resin", Journal of Colloid and Interface Science, 239 (2001), pp. 555-562.

\* cited by examiner

FAST BONDING HAIR/EYELASH EXTENSION ADHESIVE COMPOSITIONS BASED ON MEDICAL GRADE HIGH VISCOSITY CYANOACRYLATES

BACKGROUND OF THE INVENTION

Description of the Prior Art

The present invention is directed to adhesive compositions for use in bonding keratin-based materials such as hair and eyelashes. In particular, the present invention provides a method and compositions for adhering a hair or eyelash extension system to human hair and eyelashes, respectively.

A large number of methods and devices for extending keratin materials, especially hair, have been reported in the prior art. One of the earliest methods is to sew or plait natural or synthetic hair extensions into hair growing on the human head, which has been disclosed in prior art such as U.S. Pat. Nos. 5,121,761, 5,899,209, and 7,320,327. Applying hair extensions by these plaiting methods is time-consuming and thus costly. This method might also make it difficult for the person to brush his/her hair due to the presence of the plaits.

Another method commonly employed is to use a tube, a tip or a ring to attach artificial keratins to human hair. For example, U.S. Pat. No. 5,894,846 to Mannier teaches the attachment of hair extensions to strands of knotted, scalp hair using heat shrinkable tubes. U.S. Pat. Appl. Pub. No. 2010/0059079 to Tokko discloses a device for hair extension, which comprises a tube, a hair bundle and a link. Further examples in this regard include those disclosed in U.S. Pat. Nos. 6,938,624, 7,246,623, 7,726,321 to Arroyo et al., U.S. Pat. Nos. 7,614,403, 7,614,403 to Nomura, and U.S. Pat. Appl. Pub. No. 2009/0014023 to Waters, 2009/0014023 to Tokko, 2008/0011314 to Arroyo et al., U.S. Pat. Appl. Pub. No. 2008/0295856 to Kallabat et al., U.S. Pat. Appl. Pub. No. 2010/0006115 to Croes-Stoffer, and U.S. Pat. Appl. Pub. No. 2010/0154815 to Chang. Hair extension via a tube, tip or ring is less durable and is effective for only a short period of time. In the case of using a crushing tip, tube or ring to secure the hair extensions to the user's hair, sharp edges can be created near the scalp, which may impose the user on the risk of injury.

A further method for hair extension is to attach artificial keratins to human hair using an adhesive. U.S. Pat. Nos. 4,934,387 to Megna, U.S. Pat. No. 5,072,745 to Cheh, U.S. Pat. No. 5,107,867 to Barrington, U.S. Pat. No. 5,575,298 to Hinton, and U.S. Pat. No. 5,868,145 to Spann teach the use of different adhesives such as thermoplastic glue, hot melt adhesive, thermosetting adhesive, contact adhesive, and cyanoacrylate adhesive for such purpose. In addition, self adhesive tape has been disclosed for attaching hair extensions to human hair growing on the scalp. Examples can be seen in U.S. Pat. Nos. 6,135,122 to Campbell, U.S. Pat. No. 6,405,736 to Townsend, U.S. Pat. No. 6,935,348 to Gold, U.S. Pat. Nos. 7,201,171, and 7,533,676 to Sthair, as well as in U.S. Pat. Appl. Pub. No 2007/0006890 to Sthair. While a hair attachment is relatively easy to apply, the self adhesive tape provides a less effective means to attach hair extension because of its premature separation. Disadvantages of using adhesives disclosed in prior art as bonding agents for hair extension may include the "runniness" caused by low viscosity and the length of time required for curing of the adhesives.

Compared to the large number of studies on hair extension, fewer devices and methods were developed for, more particularly, eyelash extension. Mascara is used to add thickness and extend the length of a person's natural lashes. In addition, attaching individual artificial eyelashes to the edge of a user's eyelid or onto a user's natural eyelashes using adhesives is reported in prior art. U.S. Pat. No. 6,029,674 to Han teaches a device for attaching a false eyelash with an original adhesive thereon to an eyelid when the original adhesive has lost its adhesion. The device includes a core and an adhesive coating that surrounds the core so as to form an attaching element. U.S. Pat. No. 7,600,519 to Dinh discloses a method for applying eyelash extensions, which include fastening the person's eyelashes against his/her face and attaching multiple layers of eyelash extensions to the person's eyelashes. U.S. Pat. Appl. Pub. No. 2007/02275520 to Merszei teaches a self-adhesive artificial eyelash unit that is attached to a user's existing natural eyelashes. U.S. Pat. Appl. Pub. No. to 2008/0196732 to Merszei discloses a quality controlled artificial eyelash extension system having a method and materials for the application of artificial lash hair onto existing natural eyelashes of a user. U.S. Pat. Appl. Pub. No. 2009/0217938 to Rabe et al. teaches an eyelash extension system having a backbone and a plurality of eyelash extensions attached to the backbone using latex adhesives, solvent-borne adhesives, pressure-sensitive adhesives and hot-melt adhesives. U.S. Pat. Appl. Pub. No. 2009/0266376 to Beschta discloses a kit for lash or hair extension by applying both a bonding agent and a sealing agent.

It is well known that cyanoacrylate-based adhesives provide stronger bonding strength than most other liquid adhesives. Considering their strong tensile strength, cyanoacrylate-based adhesives are commercially available for eyelash extension such as Platinum Bond and Masterbond. However, those cyanoacrylate-based glues exhibit several drawbacks. First of all, such adhesives are made of short-chain cyanoacrylates. The short-chain monomers such as ethyl cyanoacrylate and methyl cyanoacrylate were histotoxic, demonstrating acute and chronic inflammatory reactions primarily as the result of foreign-body reactions when they were used to close wounds and bond other human tissues. Most lash adhesives currently produced are industrial quality adhesives that are not FDA approved for cosmetic or medical applications. In addition, many cyanoacrylate adhesives were originally formulated with the automotive industry in mind and can contain impurities that are not safe for use on humans.

Other drawbacks of using cyanoacrylate adhesives currently available include its "runniness" caused by low viscosity, which makes it difficult to apply the adhesive onto the tiny eyelash or hair. Moreover, the bonding time of the adhesives disclosed in prior art is slow and it usually takes approximately 2 to 10 minutes to finish one eyelash or hair extension. The length of time required for eyelash/hair extension imposes a burden on the customers and the technician, which in turn makes these procedures costly. In order to improve the bonding time of adhesive for hair/eyelash extension, different methods and procedure have been disclosed. For example, U.S. Pat. Appl. Pub. No. 2009/0266376 to Beschta discloses a procedure for reducing the time required to secure the eyelash extension with the natural eyelash by applying a sealing agent to the eyelash extension, secured by the adhesive composition. The sealing agent can reduce the time for the adhesive to cure; however, applying a sealing agent to each individual eyelash/hair extension makes this procedure complicated as well as time-consuming.

Therefore, there is a need for safe, fast, and easy application technique for attaching eyelash extensions, which can overcome one or more the foregoing disadvantages of conventional adhesives for extending eyelashes. It would be desirable to provide an adhesive composition that is made of medical grade cyanoacrylates and is safe for human use. It would be also desirable to provide an adhesive composition having a fast bonding time so that the procedure for eyelash extension can be dramatically shortened. It would also be desirable to provide an adhesive with a high viscosity so that the adhesive is easy to apply. It is thus an object of the present invention to provide a medical grade adhesive composition based on long-chain cyanoacrylates containing at least one thickening agent, which provides a fast bonding time for attaching artificial eyelash/hair to natural human eyelash/hair.

SUMMARY OF THE INVENTION

The present invention relates generally to adhesive compositions for attaching eyelash/hair extension with natural eyelash/hair. In particular, the present invention provides adhesive compositions which are safe to use, fast to apply, and easy to operate.

In one aspect, the present invention provides a fast-bonding and long-lasting adhesive composition with a high viscosity for attaching eyelash/hair extension systems to human eyelash/hair, comprising: a cyanoacrylate monomer having a straight alkyl chain length of from 4 to 16 carbon atoms; an organic polymer thickening agent; an inorganic thickening agent; and a bonding accelerator, wherein the inorganic thickening agent does not separate from the composition.

Incorporation of a bonding accelerator into cyanoacrylate-based adhesives drastically reduces the time required to attach eyelash/hair to natural human eyelash/hair. At least one bonding accelerator is homogenously mixed with cyanoacrylate, which improves the bonding speed of the adhesive. In embodiments of the present invention, less than 30 seconds is required for said adhesive to secure the eyelash/hair extension. In preferred embodiments of the present invention, less than 20 seconds is required for said adhesive to secure the eyelash/hair extension. In more preferred embodiments of the present invention, less than 10 seconds is required for said adhesive to secure the eyelash/hair extension. In more preferred embodiments of the present invention, less than 5 seconds is required for said adhesive to secure the eyelash/hair extension. In addition, incorporation of a bonding accelerator does not adversely affect the shelf life stability of the adhesive compositions. Accelerated curing of adhesive compositions, for attaching artificial or synthetic hair/eyelash to natural hair/eyelash, can drastically reduce the whole time required for this single hair-by-hair extension procedure. Shortening this procedure can release a potential burden on the customers and the beauty technician caused by a lengthy and tedious process, and effectively decreases the overall cost of the procedure.

For the purpose of easy operation, the present invention provides adhesive compositions with a desired high viscosity so that the adhesives do not run on the substrates. In the meantime, the adhesives are fluid and readily movable when they are being mixed, brushed by the applicator, stored in the vials and bottles, and transferred by the pipette. The desired high viscosity of adhesive compositions disclosed herein for eyelash/hair extension are obtained by incorporating at least two thickening agents into the adhesives. The primary thickening agent is a partial polymer of cyanoacrylate, prepared by incorporating triblock copolymers of polyoxyalkylene into cyanoacrylate monomers. Fumed silica is used as the secondary thickening agent in said eyelash/hair extension adhesives. In preferred embodiments, the viscosity of the adhesive compositions containing both the primary and secondary thickening agents for eyelash/hair extension is in the range of from about 500 cp to about 600,000 cp, preferably from about 800 cp to about 600,000 cp and more preferably from about 1,000 cp to about 500,000 cp.

For proper attachment of extension systems to natural eyelash/hair, the adhesive compositions in the present invention provide a desirable bond strength and adhesiveness. Real time monitoring during the course of developing embodiments for the present invention was conducted in order to assess the ability of said adhesives to keep the adhesiveness between different substrates such as synthetic or natural hair/eyelash. It was demonstrated that an extension system attached onto natural eyelash/hair can last at least 4 months.

A black pigment was included in adhesive compositions disclosed in the present invention for attaching extension systems to natural eyelash/hair. In preferred embodiments, said adhesive compositions provide a stable shelf life after incorporating various additives such as bonding accelerators, thickening agents, and black pigments. Adhesive compositions disclosed herein may provide an extended shelf life of at least 13 months.

DETAILED DESCRIPTION OF THE INVENTION

As disclosed herein, all terms are intended to have their ordinary and accustomed meaning in the art unless otherwise specifically defined. The term "monomer" may represent monomers, oligomers, and polymers which are capable of further polymerization. The term "polymer" represents homopolymers, copolymers and the like. The term "keratin materials" or "keratin-based materials" includes, without limitation, eyelashes, hair, and eyebrows.

Based on an intensive study to solve the above problems associated with adhesives for hair/eyelash extension in prior art, the present invention provides an adhesive composition that comprises medical grade cyanoacrylate adhesives. Medical-grade cyanoacrylate adhesives are similar in chemistry to industrial cyanoacrylate adhesives; however, they differ in a major way. Medical-grade adhesives are nontoxic once they are cured. The short-chain monomers such as ethyl cyanoacrylate and methyl cyanoacrylate are histotoxic and demonstrate acute and chronic inflammatory reactions primarily as the result of foreign-body reactions when they were used to close wounds and bond other human tissues; however, degradation of the long-chain cyanoacrylate monomers such as 2-octyl cyanoacrylate and n-butyl cyanoacrylate was slower and the polymer films of long-chain cyanoacrylates sloughed off before any significant degradation occurred. It was thus determined that long-chain cyanoacrylates could be used to hold wounds together without any significant toxicity. Long-chain cyanoacrylate-based products such as SurgiSeal®, Histoacryl, Indermil, Dermabond®, Derma+Flex QS, Liquiband, and Glustitch have been approved by the U.S. Food and Drug Administration (FDA) as a topical wound closure products. In embodiments of the present invention, medical grade cyanoacrylates are employed to prepare adhesive compositions for attaching synthetic or natural keratin material to a user's natural eyelashes.

Cyanoacrylate adhesive compositions prepared according to the preferred embodiments of the present invention for use in eyelash/hair extension have a viscosity such that the adhesive stops running or is substantially prevented from dripping when they are placed onto substrate surfaces such as a gloved hand. In more preferred embodiments, adhesive compositions containing at least one thickening agent has such a high viscosity that the adhesive put on the substrate dose not run down on the substrate when the substrate turns vertical. It is convenient and easy for the technician to operate and apply said adhesives for attaching eyelash/hair extensions to human keratin materials. Therefore, cyanoacrylate adhesives for hair/eyelash extension can overcome the running problem of the conventional adhesives.

In some preferred embodiments, the adhesive composition for hair/eyelash extension comprises only an organic polymer thickening agent. In other preferred embodiments, the adhesive compositions disclosed herein for eyelash/hair extension include both organic polymer-based thickening agent (also referred to herein as "the primary thickening agent") and inorganic thickening agent (also referred to herein as "the secondary thickening agent"). Usually the secondary thickening agent is introduced into the adhesive compositions after the incorporation of the primary thickening agent. In spite of the fact the adhesives are thick and preferably in a gel state the adhesives are readily transferable when they are being mixed, brushed by the applicator, stored in the vials and bottles, and transferred by the pipette. As disclosed herein, the cyanoacrylate adhesive compositions are in a gel state after incorporating either one or both of the organic polymer-based thickening agent and the inorganic thickening agent. The compositions of the present invention show a homogeneous appearance in spite of the fact that inorganic fillers are not dissolved in the adhesive composition. It is known that inorganic fillers tend to precipitate in an organic phase such as in an adhesive composition and eventually separate from the organic phase so that they lose their functions. For example, certain inorganic fillers used as the thickening agents of the adhesive compositions could isolate from the adhesive composition in a short period and lead to the dramatic decrease of the desired high viscosity of the adhesive composition, which makes the adhesive unusable for certain purposes. It is surprising to observe that the inorganic thickening agents used in the present invention do not separate from the gel adhesive compositions and the viscosity of the adhesive composition is maintained to a desired level during the shelf life of the adhesive composition.

Suitable primary organic polymer-based thickening agents include, but are not limited to, polycaprolactone, copolymers of alkylacrylate and vinyl acetate, polyalkyl methacrylates, polycyanoacrylate, polyalkyl acrylates, lactic-glycolic acid copolymers, lactic acid-caprolactone copolymers, polyorthoesters, copolymers of alkyl methacrylates and butadiene, polyoxalates, triblock copolymers of polyoxypropylene flanked by two hydrophilic chains of polyoxyethylene, and mixtures thereof. The preferred thickening agent can be a partial polymer of cyanoacrylate as disclosed in U.S. Pat. Appl. Pub. No. 2009/0318583, which is incorporated herein by reference. Preferred thickening agents can also be triblock copolymers of polyoxyalkylene as disclosed in U.S. Pat. Appl. Pub. No. 2009/0317353, which is incorporated herein by reference.

The term "partial polymer of cyanoacrylate" refers to the product obtained by heating a cyanoacrylate monomer in the presence of pluronic polymer. The cyanoacrylate monomer becomes partially polymerized by the pluronic polymer's addition and then the partial polymerization is quenched by adding stabilizers to the compositions to provide the desired level of viscosity: Cyanoacrylate adhesive compositions with the desired level of viscosity can also be prepared by diluting highly viscous cyanoacrylate compositions (e.g. thick gel materials prepared according to the present invention) with cyanoacrylate monomers.

Pluronics, the trade name for poloxamers (the terms "poloxamer" and "pluronic" are interchangeably used herein), are nonionic tailback copolymers composed of a central hydrophobic chain of polyoxypropylene flanked by two hydrophilic chains of polyoxyethylene. Because the lengths of the polymer blocks can be customized, many different poloxamers exhibit slightly different properties. For the generic term poloxamer these copolymers are commonly named with the letter "P" followed by three digits, the first two digits times 100 gives the approximate molecular mass of the polyoxypropylene core and the last digit times 10 gives the percentage polyethylene content (e.g. P407=poloxamer with a polyoxypropylene molecular mass of 4000 g/mole and a 70% polyoxyethylene content). For the Pluronic trade name, coding of these copolymers starts with a letter to define its physical form (L=liquid, P=paste, F=flake (solid)) followed by two or three digits. The first digit(s) refer to the molecular mass of the polyoxypropylene core (determined from BASF's Pluronic grid) and the last digit times 10 gives the percentage polyoxyethylene content (e.g. Pluronic F127=pluronic with a polyoxypropylene molecular mass of 4000 g/mol and a 70% polyoxyethylene content. Therefore P407 defines the same poloxamer as Pluronics F127. The general structure of pluronic polymer is shown in below.

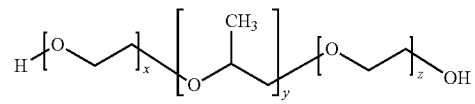

Structure of Pluronic Polymer

[alpha-Hydroxy-omega-hydroxypoly(oxyethylene)$_x$ poly(oxypropylene)$_y$ poly(oxyethylene)$_z$ block polymer]

In the above formula, in one embodiment, x is from 5 to 200, in an alternative embodiment x is from 10 to 175, and in a still further alternative embodiment x is from 10 to 150.

In the above formula, in one embodiments, y is from 5 to 100, in an alternative embodiment y is from 15 to 80, and in a still further alternative embodiment y is from 20 to 60.

In the above formula, in one embodiments, z is from 5 to 200, in an alternative embodiment z is from 10 to 175, and in a still further alternative embodiment z is from 10 to 150.

In certain embodiments x may equal z. Typically, in a preferred embodiment, the poloxamers have a molecular weight of from about 2000 to about 20000 daltons, in other embodiments from about 3000 to about 18000 daltons.

The table below demonstrates some of the possible values of x, y and z for poloxamers.

| Poloxamer | x | y | z |
|---|---|---|---|
| 124 | 12 | 20 | 12 |
| 188 | 80 | 27 | 80 |
| 237 | 64 | 37 | 64 |

| Poloxamer | x | y | z |
|---|---|---|---|
| 338 | 141 | 44 | 141 |
| 407 | 101 | 56 | 101 |

The pluronic polymers that may be utilized in this invention include preferably pluronic F38 prill, pluronic F68 prill, pluronic F88, pluronic F108NF and pluronic F127 prill, in the preferable amount 0.02 to 0.5%. Any other suitable pluronic polymer additive, such as, but not limited to, pluronic 10R5, pluronic 17R2, pluronic 17R4, pluronic 25R2, pluronic 25R4, pluronic 31R1, pluronic F68 LF, pluronic F68NF, pluronic F68 NF prill poloxamer 188, pluronic F77, pluronic F87, pluronic F98, pluronic F108, pluronic F127, pluronic F127 NF, pluronic F127 NF prill poloxamer 407, pluronic L 10, pluronic L 101, pluronic, L121, pluronic L 31, pluronic L 35, pluronic, L 43, pluronic L44, pluronic, L44 NF poloxamer 124, pluronic, L 61, pluronic 62, pluronic L62 LF, pluronic, L 62D, pluronic L64, pluronic L 81, pluronic L 92, pluronic N 3, pluronic P 103, pluronic P 104, pluronic P 105, pluronic P 123 surfactant, pluronic P 65, pluronic, P 84 and pluronic P 85, can also be used. (Pluronic polymers were obtained from BASF Corporation, 100 Campus Drive, Florham Park, N.J., USA). The use of biocompatible pluronic polymers as additives makes the cyanoacrylate adhesive compositions of the current invention especially suitable for medical use. Pluronic polymers such as pluronic F127 are preferred additives for medical applications as this pluronic polymer has been approved by FDA for medical use and they are biocompatible.

The amount of pluronic polymer added to the cyanoacrylate monomer depends upon the required level of viscosity and the presence of stabilizers in the cyanoacrylate monomer. The pluronic polymer additive is preferably present in an amount of about 0.01% to about 0.80% by weight of the total weight of the cyanoacrylate compositions. In alternatively preferred embodiments, the pluronic polymer additive is present in an amount of about 0.02% to about 0.5% by weight, or about 0.04% to about 0.30%, and more preferably in an amount of about 0.07% to about 0.16% by weight of the cyanoacrylate composition.

The present invention provides a method of preparing cyanoacrylate ester compositions with the desired level of viscosity using a combination of polymer additive and cyanoacrylate mixed at an elevated temperature. Pluronic polymer is not soluble in 2-cyanoacrylate adhesive compositions at room temperature. However, it may be dissolved at mildly elevated temperatures in the range of about 30° C. to about 70° C., preferably from about 40 to about 65° C., and more preferably from about 50 to about 60° C. Dissolution of pluronic polymer in cyanoacrylate monomer induces the partial polymerization of the cyanoacrylate monomer to increase the viscosity of the composition to a desired level.

The mixing temperature also affects the performance of the cyanoacrylate compositions. In order to evaluate the effect of temperature, cyanoacrylate adhesive compositions were prepared at different temperatures in the presence of the pluronic polymer. In most of the cases, the partial polymerization induced by the pluronic polymer occurs in the range of about 30° C. to about 70° C., preferably at about 40 to ° C. about 60° C. to provide cyanoacrylate adhesives with a desired level of viscosity.

Pluronic polymers are mild polymerization initiators and partial polymerization can be controlled by modifying the amount of pluronic polymer and polymerization inhibitor in the cyanoacrylate monomer. Preferably, cyanoacrylate monomer pre-stabilized with a certain amount of free radical and acid stabilizer is partially polymerized to provide the adhesive composition with the desired level of viscosity.

The viscosity level of the cyanoacrylate adhesive compositions is determined by many factors such as the amount of pluronic polymer, the amount of stabilizer present in the cyanoacrylate monomer, the mixing temperature and the mixing time before quenching the partial polymerization of the cyanoacrylate. The viscosity level of the cyanoacrylate adhesive compositions is dependent upon the rate of partial polymerization of cyanoacrylate. Therefore, to increase the viscosity of the cyanoacrylate adhesive one can increase the amount of pluronic polymer, decrease the amounts of the stabilizers, increase the mixing temperature and increase the mixing time.

Introducing a predetermined amount of pluronic polymer is into the cyanoacrylate monomer (without or with stabilizers) and mixing the pluronic polymer with the cyanoacrylate monomer to homogeneity at mildly elevated temperatures initiates the partial polymerization of cyanoacrylate. The viscosity of the cyanoacrylate adhesive composition increases as the polymerization of the cyanoacrylate monomer proceeds. Compared to the cyanoacrylate monomer in the absence of stabilizers, the partial polymerization rate of the cyanoacrylate monomer pre-stabilized with stabilizer is easier to control, as is the viscosity level of cyanoacrylate adhesive composition. Once the partial polymerization of cyanoacrylate monomer is initiated, polymerization will continue until it is quenched by the addition of stabilizers. In the preferred embodiments of the present invention, the viscosity of the cyanoacrylate adhesive composition may be determined using a viscometer and once a desired level of viscosity is reached stabilizers may be immediately added to quench the polymerization so that the viscosity of said cyanoacrylate compositions can be stabilized at the desired level. The quenching of the partial polymerization may be accomplished by the addition of free radical stabilizer, anionic stabilizer and/or the combination of free radical and anionic stabilizer. In embodiments of the present invention, the free radical stabilizer is, but not limited to butylated hydroxyl anisole (BHA). BHA may be used in an amount of about 200 to about 15000 ppm of cyanoacrylate compositions preferably about 1000 to about 10000 ppm, more preferably about 2000 to about 8000 ppm. The preferred anionic stabilizer is, but not limited to sulfur dioxide in an amount of about 2 to about 500 ppm, preferably about 10 to about 200 ppm.

The secondary thickening agent may include, but are not limited to, inert inorganic materials such as fumed silica, quartz, alumina, calcium, chalk, kaolin, sericite, muscovite, phlogopite, synthetic mica, lepidolite, biotite, Lithia mica, aluminum silicate, starch, smectite clays, chemically modified magnesium aluminum silicate, hydrated aluminum silicate, calcium silicate, magnesium silicate, strontium silicate, zeolite, barium sulfate, calcium sulfate, calcium phosphate, fluorine apatite, ceramic powder, and metal salts; organic powders such as polycarbonates, polyvinylidene fluorides, polyethylenes; kaolin; polyamides; poly-β-alanine and polyethylene powders; silicone resin microbeads; bismuth oxychlorides; polyurethane powders such as the hexamethylene diisocyanate and trimethylol hexyl lactone copolymer powder; precipitated calcium carbonate; ceramic microcapsules; organiccarboxylic acids containing from 8 to 22 carbon atoms; zinc stearate; magnesium stearate; lithium stearate; zinc laurate; and magnesium myristate.

The preferred secondary thickening agent is fumed silica. Fumed silica is synthetic, amorphous treated or untreated fumed silicon dioxide. The use of fumed silica has been cleared by the United States Food and Drug Administration (FDA) as a direct food additive and as substance allowed in the manufacture of materials that are in direct contact with food in various manufacturing, packing, preparing, transporting, and holding operations. Fumed silica has been extensively used in food such as ketchcup as well as in shampoo and some cosmetics because of its inert nature. When mixed into liquid, fumed silica functions as a thickener and sometimes as an anti-caking or an anti-settling agent. Fumed silica is an extremely fine particle. It is pure white and free-flowing. The addition of fumed silica to said cyanoacrylate-based hair/eyelash extension adhesives does not affect the properties of adhesives such as shelf life and cure time. Preferably, the amount of the secondary thickening agent such as fumed silica added to the cyanoacrylate-based eyelash extension adhesive compositions is from about 0.2% to about 10%, more preferably from about 0.5% to about 8%, and most preferably from about 0.8% to 7% (based on the total weight of all components in the solution). One skilled in the monomer and polymer field will be able, with some routine experimentation, to determine the amount of fumed silica that can be added to the specific cyanoacrylate used. In preferred embodiments of the present invention, the fumed silica employed is untreated. To the extent employed in connection with cyanoacrylates in the prior art, fumed silica is typically surface-treated with a different silane or siloxane derivative. Certain drawbacks are experienced by employing such surface-treated fumed silica as thickening agents of cyanoacrylates. For example, as specified in U.S. Pat. No. 4,533,422 to Litke, the combination of fumed silica treated with dimethyldichlorosilane fails to provide an adhesive composition with a high viscosity. On the other hand, incorporation of surface-treated fumed silica into cyanoacrylate could prepare a pasty composition with a viscosity that is too high. Also, the amount of acid introduced by the silica can dramatically reduce the cure speed of the composition. In addition, it has been known that using fumed silicas could cause a stability problem of the adhesive composition. For example, U.S. Pat. No. 3,607,542 discloses that cyanoacrylate compositions containing treated fumed silica are stable for only up to 4 hours.

Untreated fumed silica has many varieties that represent different surface areas. More energy is needed to disperse a given amount of fumed silica with a higher surface area into organic liquids or solvents. In other words, fumed silica with a lower surface area is easier to disperse in cyanoacrylates. Untreated fumed silica used in the said adhesive compositions for hair/eyelash extension has a surface area from about 50 m$^2$/g to about 500 m$^2$/g, preferably from about 80 m$^2$/g to about 400 m$^2$/g, and more preferably from about 100 m$^2$/g to 400 m$^2$/g.

Untreated fumed silica used as the secondary thickening agent in said eyelash/hair extension adhesive compositions include, but are not limited to, those products commercially available from Cabot Corporation, Billerica, Mass., U.S.A. and are sold by the brand name "Cab-o-sil" L-50, L-90, Lm-130, LM-150, M-5, M-5K, PTG, MS-55, H-5, H-7D, HS-5, EH-5, LM-130D, LM-150D, M-7D, MS-75D, S-17D, S-17D, HP-60, M-8D, EL-1000, MS-35, and H300.

In some preferred embodiments of the present invention, the viscosity of the adhesive compositions that include only organic polymer-based thickening agent is in the range of from about 20 cp to about 5,000 cp, preferably from about 30 cp to about 4,000 cp and more preferably from about 30 cp to about 3,000 cp.

In other preferred embodiments of the present invention, the adhesive compositions for hair/eyelash extension contain both the primary thickening agent (organic polymer-based thickening agent) and the secondary thickening agent (inorganic filler). The addition of the secondary thickening agent such as fumed silica can drastically increase viscosity of the adhesive compositions for eyelash/hair extension. For example, the viscosity of the adhesive containing the organic polymer-based thickening agent can be increased from 20-1000 cps to up to 600,000 cps by incorporating a desired amount of the secondary thickening agent. In preferred embodiments, the adhesive compositions are in a gel state upon addition of fumed silica so that the adhesive composition stops running for easy application, but are readily transferable for handling, storage, packaging and transportation. It is thus an advantage of the present invention to provide an easy-to-use eyelash/hair extension adhesive composition by incorporating both organic polymers and inorganic fillers into the adhesive compositions as the thickening agents. In preferred embodiments, the viscosity of the adhesive compositions containing the primary and secondary thickening agents for eyelash/hair extension is in the range of from about 1,000 cp to about 600,000 cp, preferably from about 1,500 cp to about 600,000 cp and more preferably from about 2,000 cp to about 500,000 cp, including from about 2,000 cp to about 500,000 cp, from about 3,000 cp to about 500,000 cp, from about 4,000 cp to about 500,000 cp, from about 5,000 cp to about 500,000 cp, from about 6,000 cp to about 500,000 cp, from about 7,000 cp to about 500,000 cp, from about 8,000 cp to about 500,000 cp, from about 9,000 cp to about 500,000 cp, from about 10,000 cp to about 500,000 cp, from about 20,000 cp to about 500,000 cp, from about 30,000 cp to about 500,000 cp, from about 40,000 cp to about 500,000 cp, from about 50,000 cp to about 500,000 cp, from about 60,000 cp to about 500,000 cp, from about 70,000 cp to about 500,000 cp, from about 80,000 cp to about 500,000 cp, from about 90,000 cp to about 500,000 cp, from about 100,000 cp to about 500,000 cp, from about 150,000 cp to about 500,000 cp, from about 200,000 cp to about 500,000 cp, from about 250,000 cp to about 500,000 cp, from about 300,000 cp to about 500,000 cp, from about 350,000 cp to about 500,000 cp, from about 400,000 cp to about 500,000 cp, and from about 450,000 cp to about 500,000 cp.

According to preferred embodiments of the present invention, the bond time of cyanoacrylate-based adhesives for attaching eyelash/hair to natural human eyelash/hair is drastically reduced by incorporating at least one bonding accelerator into the adhesive compositions, which is homogenously mixed with cyanoacrylate. This addition improves the bond time of the adhesive and does not adversely affect the shelf life stability of the adhesive compositions. Methods and procedures for applying eyelash extensions, for example, in Pat. Appl. Pub. Nos 2007/0050207, 2007/0227550, 2007/0295353, and 2008/0196732, exhibit disadvantages such as lengthy time required for curing. The present invention addresses and solves these issues. In embodiments of the present invention, less than 30 seconds is required for said adhesive to secure the eyelash/hair extension. In preferred embodiments of the present invention, less than 20 seconds is required for said adhesive to secure the eyelash/hair extension. In more preferred embodiments of the present invention, less than 10 seconds is required for said adhesive to secure the eyelash/hair extension. In more preferred embodiments of the present invention, less than 8 seconds is required for said adhesive to secure the eyelash/hair extension. In more preferred embodiments of the present invention, less than 4 seconds is required for said adhesive to secure the eyelash/hair extension. Less time required to cure the said adhesive drastically reduces potential exposure of adhesive compositions to the optical region of the customers and decreases the overall time required for the whole procedure. It is thus an advantage of the present invention to provide a significant improvement over existing procedures for applying eyelash/hair extensions.

Suitable keratin-based materials and substrates to which the keratin-based materials are bonded include, but are not limited to, artificial hair to natural human hair, natural human hair to natural human hair, artificial hair to artificial hair, artificial eyelash to natural human eyelash, artificial eyelash to artificial eyelash, and natural human eyelash to natural human eyelash, and artificial eyelash to natural human eyelash.

Real time monitoring was conducted in order to evaluate the ability of said cyanoacrylate-based adhesives to retain the adhesiveness between different substrates such as between the artificial eyelash and human natural eyelashes, between human natural hair and human natural hair, between artificial eyelash and artificial eyelash, and between artificial eyelash and human hair. Preferably, the real time monitoring was performed to evaluate the capability of said adhesive formulas to maintain the adhesiveness between artificial eyelashes and eyelash strips or fresh cut human hair. The integrity of the adhesion was tested by a slight pull on the extension. It was demonstrated that the extension system was fully adhered to the hair/eyelash that did not fall off upon gently pulling. When properly applied and maintained, the extension system attached onto human eyelash/hair by said adhesives can last at least 2 months. The extension system attached onto human eyelash/hair by preferred said adhesives can last at least 3 months, and the extension system attached onto human eyelash/hair by more preferred said adhesives can last at least 4 months. Compared to prior arts, it is the advantage of the present invention to provide adhesive formulas that can maintain the adhesiveness between eyelash extension system and human eyelash/hair for more than 4 months.

The bonding accelerator is miscible with cyanoacrylate adhesive compositions at room temperature, which will not induce the premature polymerization of the cyanoacrylate monomer with proper stabilization by free radical and anionic stabilizers. Suitable bonding accelerators include, but are not limited to, calixarenes, oxacalixarenes, silacrownethers, crown-ethers, cyclodextrin and its derivatives, polyethers, aliphatic alcohol, various aliphatic carboxylic acid esters, benzoyl peroxide, amine compounds such as are triethyl amine, diethyl amine, butyl amine, isopropyl amine, tributyl amine, N,N,-dimethyl aniline, N,N-diethyl aniline, N,N-dimethyl-p-toluidine, N,N-dimethyl-m-toluidine, N,N-dimethyl-o-toluidine, dimethyl benzyl amine, pyridine, picoline, vinyl pyridine, ethanolamine, propanolamine and ethylene diamine, quaternary ammonium salts such as alkyl ammonium salts, amide-bonded ammonium salts, ester-bonded ammonium salts, ether-bonded ammonium salts and alkylimidazolinium salts, cyclosulfur compounds and derivatives, and polyalkylene oxides and derivatives. The bonding accelerator is typically employed in an amount of from about 0.002% to about 5%, In preferred embodiments of the present invention, a crown ether as the bonding accelerator may be included in the adhesive compositions for eyelash/hair extension. Examples of crown ether include, but are not limited to, 15-crown-5,18-crown-6, dibenzo-18-crown-6, tribenzo-18-crown-6, dicyclohexyl-18-crown-6, benzo-15-crown-5, dibenzo-24-crown-8, dibenzo-30-crown-10, asym-dibenzo-22-crown-6, dimethylsila-1'-crown-4, dimethylsila-14-crown-5, dimethylsila-17-crown-6, dibenzo-14-crown-4, dicyclohexyl-24-crown-8, asym-dibenzo-22-crown-6, cyclohexyl-12-crown-4,1,2-decalyl-15-crown-5,1,2-naphtho-15-crown-5,3,4,5-naphthyl-16-crown-5,1,2-methylbenzo-18-crown-6,1,2-methylbenzo-5,6-methylbenzo-18-crown-6,1,2-t-butyl-18-crown-6,1,2-vinylbenzo-15-crown-5,1,2-vinylbenzo-18-crown-6,1,24-butyl-cyclohexyl-18-crown-6,1,2-benzo-1,4-benzo-5-oxygen-20-crown-7, and mixtures thereof. Crown ether is typically employed in an amount of from about 0.005% to about 1%, preferably from about 0.01% to about 0.8%, more preferably from about 0.02% to about 0.7%, and even more preferably from about 0.02% to 0.5%.

Incorporation of the proper amount of bonding accelerators into cyanoacrylate monomers significantly reduces the bonding time of said adhesive compositions for eyelash/hair extension. As disclosed herein, the bonding time represents the time used to attach artificial or natural eyelashes/hair to human keratin materials such as hair or eyelash, when eyelash/hair are fully adhered to the substrates, which sustains a slight pull on the extension by tweezers. Artificial hair/eyelash is attached onto natural hair/eyelash on a hair-by-hair basis. An effective amount of adhesive composition is used for securing a set of hair/eyelash extension. A certain length of the artificial hair/eyelash is attached by overlapping it onto the subject's existing natural hair/eyelash. The overlap length is from about 0.1 cm to about 0.8 cm, preferably from about 0.1 cm to about 0.6 cm, and more preferably from about 0.3 cm to about 0.6 cm. In some embodiments, it may not be necessary to adhere to every single one of the customer's natural eyelash/hair. In other embodiments, more than one eyelash/hair may be attached the same natural eyelash/hair. According to the preferred embodiments of the present invention, a very small amount of adhesive is applied to the extension system and the excess of glue should be removed from the extension system before attaching the extension system to human eyelash/hair. One drop of adhesive can attach 20-60 extension systems dependent on the size of the drop. It is the advantage of the present invention to provide more natural looking of the eyelash/hair extension system by using a very small amount of adhesive for desirably strong adhesion strength.

The adhesive compositions disclosed in the present invention may be used for attaching any kind of extensions such as natural or synthetic hair, to any type of natural keratin materials which include, but are not limited to, eyelash, eyebrow, head hair, facial hair, beard, mustache, sideburns, chest hair, underarm hair, abdominal hair, pubic hair, leg hair, back hair, arm hair, foot hair, etc. The natural keratin materials may be grown on any kind of subjects which include, but are not limited to, human, mouse, ape, monkey, horse, rabbit, dog, cat, cow, and the like.

It would be desirable to include a black pigment/dye/colorant in the adhesive composition, which is used for attaching artificial keratins to human eyelash, in order to improve the beauty and elegancy of the make-up. Suitable black dyes/colorants/pigments may include, but are not limited to, Oil Black 204, Oil Black 3-1170, Oil Black 3, Carbon Black, Vat Black 16, Vat Black 22, Vat Black 25, Vat Black 27, Vat Black 34, 05519 Black Shade R, 05512 Black Shade, Jetine Black 05503, Pig Black, Black lake blend CN, Unipure Black, Black Oil QW, Orcosolve Nigrosine SSB, Orcosolve Nigrosine NB base, Orcosolve Nigrosine SB, Direct Black 168, solvent black 46, Acid Black 210, Acid Black 194, Acid Black 26, and Acid Black 1.

In preferred embodiments, the black pigments in said adhesive compositions is Carbon Black. An effective amount of Carbon Black is added to the cyanoacrylate-based eyelash extension adhesive compositions. Carbon Black is typically present in an amount of from about 0.02% to about 1%, preferably from about 0.05% to about 1.0% and more preferably from about 0.05% to 0.60% (based on the total weight of all components in the solution). One skilled in the monomer and polymer field will be able, with some routine experimentation, to determine the amount of carbon that can be added to the specific cyanoacrylate used. Carbon Black as a black pigment in cyanoacrylate is disclosed in, for example, U.S. Pat. No. 3,607,542 to Leonard et al.; U.S. Pat. No. 4,720,513 to Kameyama et al.; U.S. Pat. No. 4,749,778 to Fukuzawa et al.; U.S. Pat. No. 4,980,086 to Hiraiwa et al.; U.S. Pat. No. 5,340,873 to Mitry; U.S. Pat. No. 6,797,107 to Kotzey; U.S. Pat. No. 7,070,902 to Mulligan et al.; U.S. Pat. No. 7,621,966 to Brun; and U.S. Pat. No. 7,682,405 to Brun et al., the disclosures of which are hereby incorporated by reference in their entirety.

In other embodiments, the adhesive compositions for hair/eyelash extension may be clear. In these embodiments, the compositions are free of colorant/dye/pigment. Thus, one embodiment of the present invention provides adhesive compositions for attaching the hair/eyelash extension system to human natural keratin fiber, wherein the composition does not comprise colorants/dyes/pigments.

In order to prevent the premature polymerization of cyanoacrylate monomers and provide long-term stability of cyanoacrylate adhesive formulations, cyanoacrylate monomers are pre-stabilized with a combination of free radical and anionic stabilizers. In embodiments of the present invention, the preferred primary free radical stabilizer is butylated hydroxyl anisole (BHA). Other free radical stabilizers include without limitation, hydroquinone; catechol; hydroquinone monomethyl ether and hindered phenols such as butylated hydroxyanisol; 4-ethoxyphenol; butylated hydroxytoluene (BHT, 2,6-di-tert-butyl butylphenol), 4-methoxyphenol (MP); 3-methoxyphenol; 2-tertbutyl-4-methoxyphenol; 2-tert-butyl-4-methoxyphenol; 2,2-methylene-bis-(4-methyl-6-tert-butylphenol).

The amount of stabilizer to be used can be determined by one of ordinary skills in the art using known techniques without undue experimentation. Typically, MP is used in an amount of from about 1 ppm to about 4000 ppm, preferably from about 100 ppm to about 2000 ppm. Hydroquinone is typically used in an amount of from about 1 ppm to about 2500 ppm, preferably from about 50 ppm to about 1500 ppm. BHT is typically used in an amount of from about 1 ppm to about 10000 ppm, preferably from about 500 ppm to about 5000 ppm.

According to embodiments of this invention, the preferred anoinic stabilizer is sulfur dioxide in an amount of from about 2 ppm to about 500 ppm, preferably from about 10 ppm to about 200 ppm to pre-stabilize cyanoacrylate monomers before adding 5,5-disubstitutedhydantoin. Other anionic stabilizers may be a very strong acid including without limitation perchloric acid, hydrochloric acid, hydrobromic acid, toluenesulfonic acid, fluorosulfonic acid, phosphoric acid, ortho, meta, or para-phosphoric acid, trichloroacetic acid, and sulfuric acid. The very strong acid is typically used in an amount of from about 1 ppm to about 250 ppm, preferably from about 5 ppm to about 50 ppm.

It would be desirable that an eyelash/hair extension adhesive composition provides a shelf-life of at least 6 months; however, an increased shelf-life beyond this provides increased economic advantages to both the manufacturer and the consumer. As used herein, shelf-life refers to the amount of time the composition can be held at ambient conditions (approximately room temperature), without degradation of the composition to the extent that the composition cannot be used for the purpose for which they were intended.

In order to evaluate the stability of eyelash/hair extension adhesive compositions containing at least one thickening agent, one bonding accelerator and a black pigment, an accelerated aging test was performed. As used herein "stability" refers to the resultant composition maintaining a commercially acceptable form for the prescribed amount of time. That is, the composition does not prematurely polymerize or otherwise change form or degrade to the point that the composition is not useful for its intended purpose. Thus, while some polymerization or thickening of the composition may occur, such as can be measured by changes in viscosity of the composition, such change is not so extensive as to destroy or significantly impair the usefulness of the composition. The accelerated aging test was performed in the oven at 80° C. for a period of 7 days. Based on calculations, 7 days accelerated aging at 80° C. is equal to about 13 months of shelf life, and 1 day of accelerated aging at 80° C. is equal to 56 days at ambient temperature. Throughout the entire aging procedure, all cyanoacrylate adhesive samples retained fluid consistency and good color. Adhesiveness of those cyanoacrylate formulations for eyelash extension, as well as the ability of the compositions to dispense from the applicator, are not affected at the end of the accelerated aging, indicating that cyanoacrylate adhesive compositions provide a shelf life of at least 13 months.

In a preferred embodiment, the adhesive compositions of the present invention are based upon one or more polymerizable cyanoacrylate monomers, and/or reactive oliogmers of cyanoacrylate with long alkyl chains. Such cyanoacrylate monomers are readily polymerizable, e.g., anionically polymerizable or free radical polymerizable, to form polymers. Cyanoacrylate monomers suitable for use in accordance with the present invention include, but are not limited to, 1,1-disubstituted ethylene monomers of the formula (I):

$$HRC\!=\!CXY \tag{I}$$

wherein X and Y are each strong electron withdrawing groups, and R is H, —CH=CH$_2$, or a C$_1$-C$_4$ alkyl group. Examples of monomers within the scope of formula (I) include alpha-cyanoacrylates, vinylidene cyanides, C$_1$-C$_4$ alkyl homologues of vinylidene cyanides, dialkyl methylene malonates, acylacrylonitriles, vinyl sulfinates and vinyl sulfonates of the formula CH$_2$=CX'Y wherein X' is —SO$_2$R' or —SO$_3$R' and Y' is —CN, —COOR', —COCH$_3$, —SO$_2$R' or—SO$_3$R, and R' is H or hydrocarbyl. Preferred monomers of formula (I) for use in this invention are alpha-cyanoacrylates. These monomers are known in the art and have the formula (II):

wherein $R^2$ is hydrogen and $R^3$ is a hydrocarbyl or substituted hydrocarbyl group containing at least 4 carbons in the straight alkyl chain; a group having the formula—$R^4$—O—$R^5$—O—$R^6$, wherein $R^4$ is a 1,2-alkylene group having 2-4 carbon atoms, $R^5$ is an alkylene group having 2-12 carbon atoms, and $R^6$ is an alkyl group having 1-6 carbon atoms; or a group having the formula:

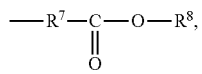

wherein $R^7$ is:

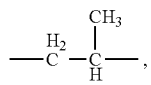

or —[C(CH$_3$)$_2$]$_n$—
wherein n is 1-14, preferably 1-8 carbon atoms and $R^8$ is an organic moiety.

Examples of suitable hydrocarbyl and substituted hydrocarbyl groups include straight chain or branched chain alkyl groups having 4-16 carbon atoms; straight chain or branched chain $C_4$-$C_{16}$ alkyl groups substituted with an acyloxy group, a haloalkyl group, an alkoxy group, a halogen atom, a cyano group, or a haloalkyl group; straight chain or branched chain alkenyl groups having 4 to 16 carbon atoms; straight chain or branched chain alkynyl groups having 4 to 12 carbon atoms cycloalkyl groups; arylalkyl groups; alkylaryl groups; and aryl groups.

The organic moiety $R^8$ may be substituted or unsubstituted and may be a straight chain, branched or cyclic, saturated, unsaturated or aromatic. Examples of such organic moieties include $C_1$-$C_8$ alkyl moieties, $C_2$-$C_8$ alkenyl moieties, $C_2$-$C_8$ alkynyl moieties, $C_3$-$C_{12}$ cycloaliphatic moieties, aryl moieties such as phenyl and substituted phenyl, and arylalkyl moieties such as benzyl, methylbenzyl and phenylethyl. Other organic moieties include substituted hydrocarbon moieties, such as halo (e.g., chloro-, fluoro- and bromo-substituted hydrocarbons) and oxy- (e.g., alkoxy substituted hydrocarbons) substituted hydrocarbon moieties. Preferred organic radicals are alkyl, alkenyl and alkynyl moieties having from 1 to about 8 carbon atoms, and halo-substituted derivatives thereof. Particularly preferred are alkyl moieties of 4 to 8 carbon atoms. In the cyanoacrylate monomer of formula (II), $R^3$ is preferably an alkyl group having 4-16 carbon atoms or a group having the formula -AOR$^9$, wherein A is a divalent straight or branched chain alkylene or oxyalkylene moiety having 4-8 carbon atoms, and $R^9$ is a straight or branched alkyl moiety having 4-8 carbon atoms. The preferred alpha-cyanoacrylate monomers used in this invention are 2-octyl cyanoacrylate, dodecyl cyanoacrylate, n-butyl cyanoacrylate, pentyl cyanoacrylate, hexyl cyanoacrylate, 3-methoxybutyl cyanoacrylate, heptyl cyanoacrlate, n-octyl cyanoacrylate, n-nonyl cyanoarylate and the like, or a combination thereof. More preferred is a mixture of n-butyl cyanoacrylate monomer and 2-octyl cyanoacrylate partial polymer comprising at least of 60% by weight of n-butyl cyanoacrylate monomer.

The adhesive compositions for hair/eyelash extension may optionally comprise other active and inactive ingredients typically associated with cosmetic products such as mascara and other hair/eyelash care products. In particular, these ingredients include at least one bioactive ingredient for improving the keratin fiber such as hair and eyelash. Suitable ingredients include, but are not limited to, vitamins, waxes amino acids, antioxidants, chelating agents, depigmenting agents, preservatives, staining agents, emollients, emulsifiers, eyelash protectants, excipients, fragrances, eyelash/hair penetration enhancers, gelling agents, humectants, hypopigmenting agents, minerals, photostabilizing agents, surfactants, and mixtures thereof. The other ingredients may be present in an amount of about 0.01% to about 15% of the total weight of the composition and more preferably of about 0.02% to about 10%. It is within the skill in the art to choose additional active and/or inactive ingredients.

The adhesive composition of the present invention may further contain additives such as synthetic resin or polymer rubber in order to improve the elasticity, flexibility and durability of adhesive composition. The synthetic resin emulsions, useable in the present invention include, but are not limited to, ethyl acrylate, methyl methacrylate, butyl methacrylate, methacrylic acid various ethylene copolymer rubbers such as copolymer of ethane and methyl 2-propenoate with 2-butenedioic ethyl ester, a copolymer emulsion of a vinylidene chloride and vinyl chloride, an alkyl acrylate copolymer emulsion, an alkylacrylate-styrene copolymer emulsion, an ethylpolyacrylate emulsion, an alkyl polyacrylate emulsion, an elastomer agent made of various compatible polymers such as natural rubber and urethane rubber, and a polyvinyl acetate resin emulsion, etc. These synthetic resins may be used alone or in any mixture thereof.

According to certain embodiments of the present invention, a plasticizer may be included in the adhesive compositions for eyelash/hair extension. The plasticizing agent preferably does not contain any moisture and should not adversely affect the stability of the cyanoacrylate compositions. Examples of suitable plasticizers include, but are not limited to, tributyl citrate (TBC), acetyl tributyl citrate (ATBC), dimethyl sebacate, diethylsebacate, triethyl phosphate, tri(2-ethyl-hexyl)phosphate, tri(p-cresyl) phosphate, diisodecyl adipate (DIDA), glyceryl triacetate, glyceryl tributyrate, dioctyl adipate (DICA), isopropyl myrisate, butyl sterate, lauric acid, trioctyl trimelliate, dioctyl glutatrate (DICG) and mixtures thereof. In addition, other additives and mixtures thereof include polyethylene glycol, triethylene glycol, triethyl glycol mono alkyl ether, triethylene glycol dialkyl ether, tetraethylene glycol, tetraethylene glycol mono alkyl ether, tetraethylene dialkyl ether, diethylene glycol, diethylene glycol monoalkyl ether, and diethylene glycol dialkyl ether.

The adhesive compositions for eyelash/hair extension disclosed in the present invention may optionally include preservatives. A preservative may be paraben such as alkyl parabens and salts thereof, ethylparaben, methylparaben, methylparaben sodium, propylparaben sodium, propylparaben, butylparaben, and the like. Other suitable preservatives include hydroquinone, pyrocatechol, resorcinol, 4-n-hexyl resorcinol, benzoic acid, benzyl alcohol, chlorobutanol, dehydroacetic acid, o-phenylphenol, phenol, phenylethyl alcohol, potassium benzoate, potassium sorbate, sodium benzoate, sodium dehydroacetate, sodium propionate, sorbic acid, thimerosal, thymol, cresols, phenylmercuric compounds such as phenylmercuric borate, and phenylmercuric nitrate.

According to the present invention, any suitable packaging system may be used to store and apply the adhesive composition for eyelash/hair extension. Suitable packaging systems may be any container which maintains the integrity of cyanoacrylate monomers. Any type of container can be used, which includes, but are not limited to, plastic, aluminum and glass. The preferred container is the disposable one in which the adhesives provide at least 12 months of shelf life. The suitable container also desirably provides a barrier to moisture so that it is compatible with the cyanoacrylate monomer compositions. The suitable packaging system may be in any container configuration such as, but not limited to, applicator, swab, vial, pouch, syringe, ampoule, or bottle, having an appropriate means, surface or tip to dispense the cyanoacrylate compositions from the container.

The present invention, in embodiments, is applicable to single-use containers and may be applicable to applicators, where it is desired to maintain a high degree of prolonged stability of the composition. Likewise, in embodiments, the present invention may also be suited for multiple-use containers or applicators, where it is desired to maintain a high degree of prolonged stability of the composition. The container size may vary depending on the volume of adhesive composition it contains. Containers of the invention may have a volume of from about 0.05 ml to 50 ml, preferably from about 0.05 ml to 40 ml, and more preferably from about 0.1 ml to 40 ml.

The following examples clearly demonstrate the overall nature and certain embodiments of the invention. These examples are intended to be illustrative only. The invention is not limited to the process parameters, materials and conditions in any way. Thus, the invention should in no way be construed as being limited to the following examples, but rather, should be construed to encompass any and all variations which become evident as a result of the teachings provided herein.

EXAMPLE 1

Bond time represents the time used to attach hair/eyelash extension to hair/eyelash cut from or growing on human head/eyelid when the extension are fully adhered to the substrates, which sustains a slight pull on the extension by the tweezers. The bond time of adhesive composition for hair/eyelash extension was measured as follows:
1) With one hand, use tweezers to pick up a cut human hair/eyelash or separate a single human natural hair/eyelash growing on the head/eyelid from others
2) Place a drop of tested adhesives onto the gloved hand
3) Using another pair of tweezers, pick up a hair/eyelash extension system and drag the end through a small dollop of the adhesive and wipe off excess of adhesive on glove
4) When the hair/eyelash extension has been layered on the hair/eyelash, overlap about ½ cm and start the clock
5) Record the time when the hair/eyelash extension was adhered to the human hair/eyelash.

EXAMPLE 2

The viscosity of the cyanoacrylate compositions for hair/eyelash extension was measured by the Brookfield DV-II+ Pro viscometer. The spindle and sample chamber were cleaned with acetone after each measurement. About 9 ml of the cyanoacrylate composition was put into the sample chamber and the chamber was brought into position. The motor was turned on after the sample was equilibrated in the sample chamber. The viscosity of the disclosed composition was measured in triplicate. Any residue was removed with acetone prior to the next sample measurement.

EXAMPLE 3

The shelf life stability of adhesive compositions for hair/eyelash extension was evaluated by an accelerated aging study at 80° C. for 7 days as follows:
1) Set up the aging oven at 80° C. and let the temperature stabilize for at least half an hour.
2) Put tested adhesive compositions into the oven at 80° C. for 7 days
3) Maintain the temperature of the oven at 80° C. for the entire time of the aging process
4) Visually inspect the appearance of adhesive compositions every day
5) Measure the viscosity and set time at day 7 of the aging and other time point determined necessary For all of the experiments detailed herein, sulfur dioxide was employed in an amount between about 2 and about 50 ppm and BHA was employed in an amount of from about 2000 to 8,000 ppm.

EXAMPLE 4

The mixture of octyl cyanoacrylate with partial polymer of 2-octyl cyanoacrylate was stabilized with BHA and $SO_2$. 78.9 g of such mixture of cyanoacrylate was mixed with 0.26 g of 18-crown-6 and 0.32 g of carbon black in a three neck round bottom flask and the mixture was stirred overnight. 1.97 g of fumed silica was added to the mixture that was stirred overnight. The viscosity of the resulting composition was about 231,800 cp. The bond time of the composition for attaching synthetic extension system to freshly-cut human hair was in the range of about 7 seconds.

EXAMPLE 5

The mixture of butyl cyanoacrylate with partial polymer of 2-octyl cyanoacrylate was stabilized with BHA and $SO_2$. 87.4 g of such mixture of cyanoacrylate was mixed with 0.26 g of carbon black in a three neck round bottom flask and the mixture was stirred overnight. 43.7 g of 18-crown-6 was added to the mixture and stirred for another 3 hours. 1.75 g of fumed silica was added to the mixture that was stirred overnight. The viscosity of the resulting composition was about 82,000 cp. The bond time of the composition for attaching synthetic extension system to human hair was in the range of about 20-25 seconds.

EXAMPLE 6

The mixture of butyl cyanoacrylate with partial polymer of 2-octyl cyanoacrylate was stabilized with BHA and $SO_2$. 98 g of such mixture of cyanoacrylate was mixed with 0.196 g of carbon black, 59 mg of 18-crown-6, and 0.57 g of fumed silica in a three neck round bottom flask that was stirred overnight. 1.39 g of fumed silica was added to the mixture that was stirred overnight. The viscosity of the resulting composition was about 18,600 cp. The bond time of the composition for attaching synthetic extension system to human hair was in the range of about 10 seconds.

EXAMPLE 7

117 g mixture of butyl cyanoacrylate with partial polymer of 2-octyl cyanoacrylate was mixed with 0.234 g of carbon black in a three neck round bottom flask and the mixture was stirred overnight. 32 mg of 18-crown-6 was added to the mixture and stirred overnight. 3.51 g of fumed silica was added to the mixture that was stirred for 5 hours. The viscosity of the resulting composition was about 52,900 cp. The bond time of the composition for attaching synthetic extension system to human hair was in the range of about 15 seconds.

EXAMPLE 8

The mixture of octyl cyanoacrylate with partial polymer of 2-octyl cyanoacrylate was stabilized with BHA and $SO_2$. 72.1 g of such mixture of cyanoacrylate was mixed with 0.22 g of 18-crown-6 and 0.22 g of carbon black in a three neck round bottom flask and the mixture was stirred for 3 days. 2.52 g of fumed silica was added to the mixture that was stirred overnight. The viscosity of the resulting composition was greater than 300,000 cp. The bond time of the composition for attaching synthetic extension system to human hair was in the range of about 10 seconds.

EXAMPLE 9

The mixture of butyl cyanoacrylate with partial polymer of 2-octyl cyanoacrylate was stabilized with BHA and $SO_2$. 111.4 g of such mixture of cyanoacrylate was mixed with 0.11 g of carbon black, in a three neck round bottom flask and the mixture was stirred for 6 hours. 44 mg of 18-crown-6 was added to the mixture that was stirred overnight. 2.79 g of fumed silica was added to the mixture that was stirred overnight. The viscosity of the resulting composition was about 62,300 cp. The bond time of the composition for attaching synthetic extension system to freshly-cut human hair was in the range of about 15 seconds.

EXAMPLE 10

100.5 g mixture of butyl cyanoacrylate with partial polymer of 2-octyl cyanoacrylate was mixed with 0.10 g of carbon black and 27 mg of 18-crown-6 in a three neck round bottom flask and stirred overnight. 1 g of tetra(ethylene glycol) dimethyl ether was added and the mixture was stirred at room temperature for 2 hours. 2.714 g of fumed silica was added to the mixture that was stirred at room temperature overnight. The viscosity of the resulting composition was about 130,000 cp. The bond time of the composition for attaching synthetic extension system to human hair was in the range of about 10 seconds.

EXAMPLE 11

The mixture of butyl cyanoacrylate with partial polymer of 2-octyl cyanoacrylate was stabilized with BHA and $SO_2$. 91.3 g of such mixture of cyanoacrylate was mixed with 0.137 g of carbon black and 91 mg of 18-crown-6 in a three neck round bottom flask and the mixture was stirred overnight. 2.283 g of fumed silica was added to the mixture that was stirred overnight. The viscosity of the resulting composition was about 152,000 cp. The bond time of the composition for attaching synthetic extension system to freshly-cut human hair was in the range of about 3 seconds.

EXAMPLE 12

31.5 g of octyl cyanoarylate was mixed with 49.1 g of partial polymer of 2-octyl cyanoacrylate in a three neck round bottom flask, to which 0.2 g of 18-crown-6 was added. The mixture was stirred overnight. 0.32 g of carbon black was added to the mixture that was stirred overnight. The viscosity of the resulting composition was about 2,500 cp. The bond time of the composition for attaching synthetic extension system to freshly-cut human hair was in the range of about 7 seconds.

EXAMPLE 13

107.1 g mixture of butyl cyanoacrylate with partial polymer of 2-octyl cyanoacrylate was mixed with 0.32 g of carbon black and 0.21 g of 18-crown-6 in a three neck round bottom flask and stirred overnight. 2.678 g of fumed silica was added to the mixture that was stirred at room temperature overnight. The viscosity of the resulting composition was about 276,000 cp. The bond time of the composition for attaching synthetic extension system to freshly-cut human hair was in the range of about 3 seconds.

EXAMPLE 14

A 4:1 mixture of n-butyl cyanoacrylate with partial polymer of 2-octyl cyanoacrylate was stabilized with BHA and $SO_2$. 281.3 g of such mixture of cyanoacrylate was mixed with 0.563 g of carbon black and 113 mg of 18-crown-6 in a three neck round bottom flask and the mixture was stirred overnight. 8.44 g of fumed silica was added to the mixture that was stirred overnight. The viscosity of the resulting composition was about 158750 cp. The bond time of the composition for attaching synthetic extension system to freshly-cut human hair was in the range of about 5 seconds.

EXAMPLE 15

54.6 g mixture of butyl cyanoacrylate was stabilized with BHA and $SO_2$. 2.184 g of fumed silica was added to the mixture that was stirred at room temperature overnight. The average viscosity of the resulting composition was 9.34 cp. The composition appeared to be very flowable. This example shows that, relative to Example 13, in the absence of organic-based polymer thickening agent, simply adding 4% of untreated fumed silica to cyanoacrylate did not provide a composition with a sufficiently high viscosity.

The foregoing examples and the description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:
1. An adhesive composition, comprising a mixture of:
   a cyanoacrylate monomer selected from the group consisting of 2-octyl cyanoacrylate monomer, n-butyl cyanoacrylate monomer, and a mixture of 2-octyl cyanoacrylate monomer and n-butyl cyanoacrylate monomer, about 200 to about 15,000 parts per million (ppm) of butylated hydroxyl anisole and about 10 ppm to about 200 ppm of sulfur dioxide,
   an organic polymer thickening agent comprising a partial polymer of 2-octyl cyanoacrylate,
   about 0.8% to 7% by weight of untreated fumed silica, and
   about 0.02% to 0.5% by weight of 18-crown-6 crown ether, wherein the composition has a viscosity of from about 100,000 to about 500,000 centipoise (cps).

2. The composition of claim 1, wherein the adhesive composition has a viscosity of from about 200,000 cps to about 500,000 cps.

3. The composition of claim 2, wherein the adhesive composition has a viscosity of from about 300,000 cps to about 500,000 cps.

4. The composition of claim 3, wherein the adhesive composition has a viscosity of from about 350,000 cps to about 500,000 cps.

5. The composition of claim 1, wherein the untreated fumed silica has a surface area of from about 50 $m^2$/g to about 500 $m^2$/g.

6. The composition of claim 5, wherein the untreated fumed silica has a surface area of from about 80 $m^2$/g to about 400 $m^2$/g.

7. The composition of claim 1, wherein the composition bonds in less than 15 seconds.

8. The composition of claim 7, wherein the composition bonds in less than 10 seconds.

9. The composition of claim 8, wherein the composition bonds in less than 4 seconds.

10. The composition of claim 1 wherein the composition further comprises a black colorant.

11. An adhesive composition, comprising:
a mixture of n-butyl cyanoacrylate monomer, about 200 to about 15,000 parts per million (ppm) of butylated hydroxyl anisole, about 10 ppm to about 200 ppm of sulfur dioxide, 2-octyl cyanoacrylate partial polymer; from about 0.8 to about 7.0% by weight of untreated fumed silica; from about 0.02% to about 0.5% by weight of 18-crown-6 crown ether; and from about 0.02% to about 1% of carbon black, wherein the composition has a viscosity of from about 100,000 to about 500,000 centipoise (cps).

12. The composition of claim 11 wherein the mixture of n-butyl cyanoacrylate monomer and 2-octyl cyanoacrylate partial polymer comprises at least 60% by weight of n-butyl cyanoacrylate monomer.

13. The composition of claim 1 wherein the cyanoacrylate monomer is n-butyl cyanoacrylate.

14. The composition of claim 1, wherein the cyanoacrylate monomer is 2-octyl cyanoacrylate.

15. The composition of claim 11, wherein the untreated fumed silica has a surface area of from about 50 $m^2$/g to about 500 $m^2$/g.

16. The composition of claim 11, wherein the untreated fumed silica has a surface area of from about 80 $m^2$/g to about 400 $m^2$/g.

17. The composition of claim 11, wherein the adhesive composition has a viscosity of from about 200,000 cps to about 500,000 cps.

18. The composition of claim 11, wherein the adhesive composition has a viscosity of from about 300,000 cps to about 500,000 cps.

19. The composition of claim 11, wherein the adhesive composition has a viscosity of from about 350,000 cps to about 500,000 cps.

* * * * *